Feb. 21, 1961 H. W. FULLER ET AL 2,972,735

DATA PROCESSING

Filed May 4, 1955 2 Sheets-Sheet 1

INVENTORS
HARRISON W. FULLER
ROBERT C. KELNER
BY Joseph Weingarten
ATTORNEY

INVENTORS
HARRISON W. FULLER
ROBERT C. KELNER
BY Joseph Weingarten
ATTORNEY

United States Patent Office 2,972,735

Patented Feb. 21, 1961

2,972,735

DATA PROCESSING

Harrison W. Fuller, Boston, and Robert C. Kelner, Concord, Mass., assignors to Laboratory for Electronics, Inc., Boston, Mass., a corporation of Delaware Filed May 4, 1955, Ser. No. 505,894

11 Claims. (Cl. 340—174.1)

This invention relates in general to data processing apparatus and more particularly to a self-clocked technique of reading magnetically stored binary digital data with reliable readout at packing densities substantially higher than attainable with prior systems.

Basically, information is stored in a magnetic medium by switching the medium between its two possible saturated states in accordance with the polarity of current energizing a coil of a writing head. Recovery of the information is accomplished by moving the track with respect to a reading head, which senses the flux variations resulting from adjacent spots being in different magnetic states, and provides an output voltage proportional to the rate of flux change.

One method of writing information is a double pulse RZ (return to zero) system where information is stored by energizing the writing head with a pair of oppositely polarized current pulses for each bit of stored information. To write the binary digit Zero, for example, the writing head is energized with a negative pulse followed by a positive pulse, the reverse sequence being employed to write a One.

It has been customary to write each digit in synchronism with an externally generated clock pulse. One convenient source of clock pulses often utilized, when the storage medium is a magnetic drum or tape, is a clock pulse track, parallel to the information tracks. Aligned with each cell in an information track, is a cell of the clock pulse track in which a clock pulse is stored. Hence, reading out an information pulse occurs in synchronism with the reading of a pulse from the clock pulse track; that is, the read out clock pulse pinpoints the time for reading an information cell. This system is entirely satisfactory for low packing densities, but with the advent of higher packing densities, as made feasible through the utilization of a readout method disclosed in the copending application of Paul A. Husman, Serial No. 448,590, now Patent No. 2,896,192, issued July 21, 1959, entitled Data Processing Apparatus, difficulties, such as maintaining the close alignment required between the heads reading clock pulse and information tracks, seriously hamper the reliability of the storage system.

It is a primary object of this invention to avoid prior mechanical synchronization problems through the provision of means for reading out binary data stored in a magnetic medium without reference to an external timing source.

Another object is to provide a recording system for storing information in a magnetic medium in a manner which results in a readout signal, derived when recovering the stored information, especially suitable for interpretation without reference to an external timing source.

Another object is to enable accurate readout of densely packed binary data stored in a magnetic medium.

A further object is to provide means for verifying the accuracy of the read-out data signal.

Still another object is the provision of means for determining the beginning and end of an information block containing stored data.

An object is to identify the beginning of an information block, read out the data stored therein, and identify the end of the block without reference to an external clocking source.

Another object is the provision of means for introducing the read-out data into a computing system synchronously with an external timing source.

These and other objects and advantages of the invention will become apparent from the following specification read with reference to the accompanying drawing in which.

Figure 1:
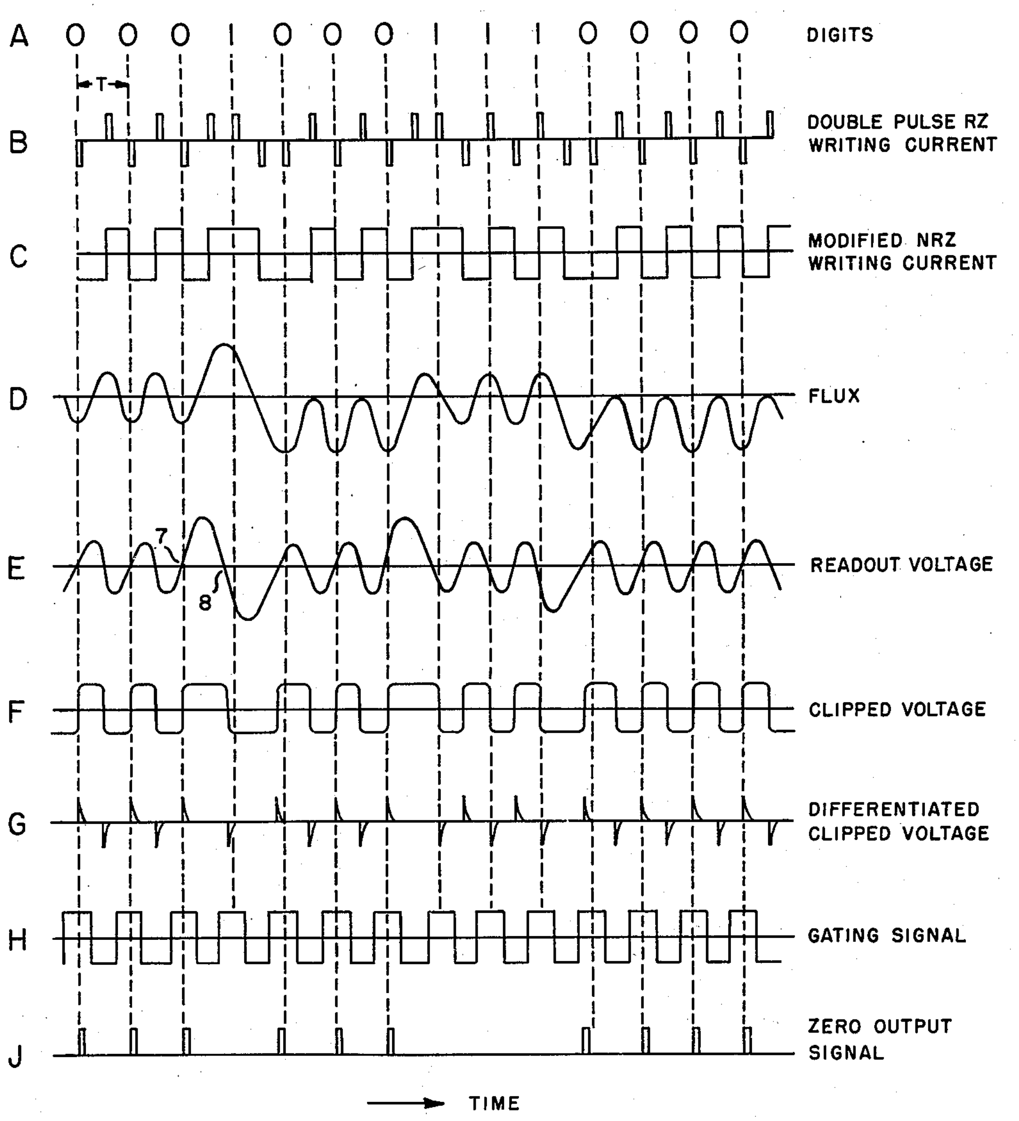
Fig. 1 is a graphical presentation of waveforms plotted to a common time scale, helpful in understanding the basic principles of the invention.

With reference now to the drawing and more particularly Fig. 1 thereof, the principles of the invention will be better understood from the following discussion of the signal waveforms related to a particular binary digit sequence. A writing current waveform of Fig. 1B, representative of the digit sequence of Fig. 1A, induces the densely-packed flux waveform of Fig. 1D in the magnetic medium.

While the well-known RZ (return-to-zero) system of writing information records a flux waveform which may be read out in the manner described below, the double pulse RZ recording system illustrated in Fig. 1B provides advantages worthy of discussion. In this writing method it is seen that to write the binary digit Zero, the writing head is energized first with a negative current pulse, and then with a positive pulse. Conversely, the binary digit One is inserted into a storage cell by a positive current pulse followed by a negative pulse. The significance of the name double pulse RZ recording system now becomes clear, for the recording of one binary digit into a storage cell is accomplished by energizing the writing head with a pair of oppositely polarized current pulses. It is to be noted that the time separation between current pulses is constant. This separation is one-half the bit period T, illustrated in Fig. 1A and defined below.

This method of recording results in a reduction in the magnitude of variations in the peak-to-peak amplitude of the flux waveform recorded in the magnetic medium with variations in digit sequences. The read-out voltage derived from scanning the medium then has lessened peak-to-peak amplitude variations. When this voltage waveform is clipped and differentiated as discussed below, the time spacing and amplitude of the pulses so derived are more regular than those derived from a readout signal obtained from conventional RZ stored data. Hence, the reliability and ease with which densely packed data may be interpreted is greatly enhanced. In addition the double pulse RZ system of recording results in complete erasure of the previously stored information, even though the storage cell written into is slightly displaced from the cell storing the data inserted during an earlier scan; that is, erasure is still complete even when two successive recordings are asynchronously applied. Furthermore, the readout voltage has at least one zero crossover per cell, enhancing its applicability for the self-clocked readout described below.

Another method of recording data, which provides the advantages described above, is the modified NRZ (non-return-to-zero) system illustrated in Fig. 1C. Fundamentally, this system may be considered the double-pulse RZ system with the current pulse durations increased to $$\frac{T}{2}$$

or one-half the bit period. Hence, the current never returns to zero, but crosses it at least once during the passage of a storage cell across the writing head. With this in mind, it is apparent that the foregoing discussion concerning the double-pulse RZ system is applicable to the modified NRZ system. The flux waveform of Fig. 1D is also applicable when the digit sequence of Fig. 1A is recorded by the modified NRZ system.

The readout voltage waveform is proportional to the time derivative of the flux waveform, and after being processed in the manner disclosed in the above-identified Husman copending application, appears as in Fig. 1E. While the present invention is particularly effective when used in conjunction with the Husman high packing density readout, the teachings of this application will be found equally applicable for readout under lower packing density conditions. This waveform is clipped and appears as in Fig. 1F.

It is convenient to define a bit period as the time interval between the insertion of binary digits into adjacent storage cells of the medium. On the time scale of Fig. 1, this is the time interval T. Note that during each half-bit-period centered about a time corresponding to that during which the reading head scans the center of the flux area established by the first current pulse for each binary digit recorded (which for Fig. 1 means that the half-bit periods referred to will be centered upon the vertical broken guide lines), there is a zero crossover, or polarity reversal in the readout signal of Fig. 1E. Observe that a positive-going polarity reversal, such as at 7, corresponds to a recorded Zero while a negative-going reversal, such as at 8, signifies a One. Polarity reversals which occur during these half-bit-periods will hereafter be referred to as significant crossovers.

The polarity reversals which occur outside the half-bit-periods defined immediately above will be called auxiliary crossovers. Auxiliary crossovers occur only between adjacent significant crossovers corresponding to identical digits. Hence, no auxiliary crossover occurs between adjacent significant crossovers, where these significant crossovers are the result of opposite digits.

The signal of Fig. 1F is differentiated to provide a series of positive and negative spikes (Fig. 1G) related to the sense of the zero crossovers of the clipped voltage waveform. The gating signal is derived from the readout signal in a manner described below so that when applied to a gate coincident with the spikes of Fig. 1G, only a spike derived from a significant crossover passes through the gate. A positive spike so derived corresponds to a zero, a negative spike, to a one. By such a system, the period of the gating signal equals that of the bit period, the "on" condition of the gate timed to bracket those information pulses which occur at a time separation substantially equal to the bit period. In the form described above and in the practical example described below, the auxiliary crossovers are neglected; however, it is possible to compare the auxiliary crossovers with an adjacent significant crossover as a means of verifying the accuracy of the read-out information. The discussion below will expand on this.

Having described in a general manner the nature of some waveforms involved in practicing the invention, it is appropriate to discuss a practical example of apparatus which functions on the basis of the principles taught herein. Basically, this apparatus includes means to derive a signal related to the stored data, the signal having one significant zero crossover for each bit of stored data, means to recognize the sense of the crossovers, and gating means which provides an output signal coincident only with each significant crossover and indicative of the sense of the crossover.

Figures 2, 3:
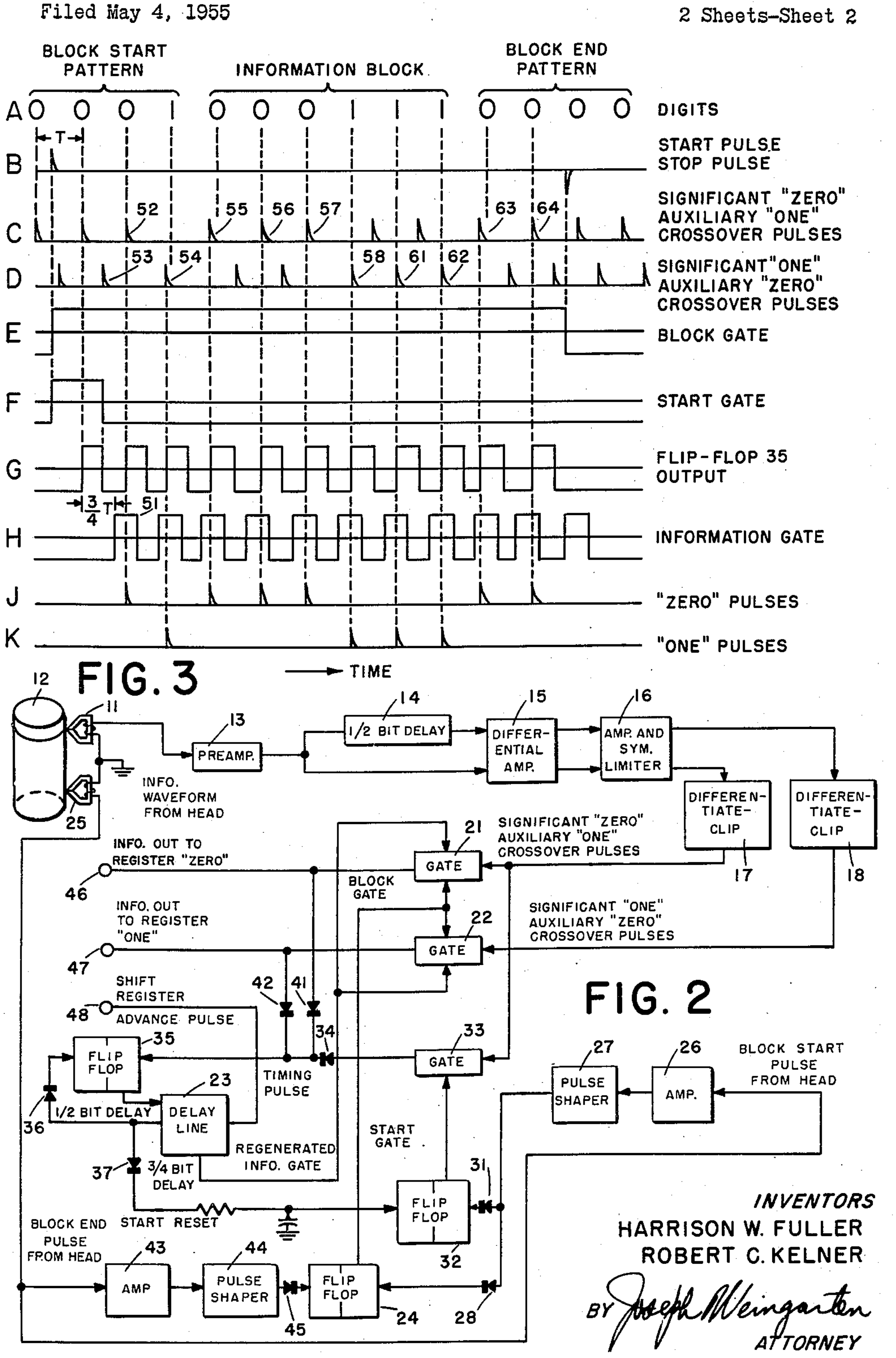
Fig. 2 is a block diagram of apparatus embodying the underlying concepts of the invention.
Fig. 3 is a graphical representation of signal waveforms associated with the apparatus of Fig. 2, pertinent to an understanding of its operation.

Referring to Fig. 2, a block diagram of one system for practicing the invention is shown. Reading head 11 scans the information track of magnetic drum 12, thereby providing an output signal which is processed in accordance with the method taught by Husman supra by preamplifier 13, delay line 14 and differential amplifier 15. The two output signals from differential amplifier 15 are identical in waveform but opposite in phase. Through parallel channels, these signals are amplified and clipped symmetrically in limiting amplifier 16. Differentiator clippers 17 and 18 respectively differentiate and clip the parallel-channelled rectangular waveforms from limiting amplifier 16. As a result, all negative spikes of Fig. 1G appear in the output of differentiator-clipper 18 with positive polarity, while all the positive spikes in the waveform remain positive in the output of differentiator-clipper 17.

Gates 21 and 22 are energized by the crossover pulses from the differentiator-clippers 17 and 18 respectively and simultaneously by the gating signal of Fig. 1H from delay line 23 and the block gating signal from flip-flop 24. All three signals must be present to provide an output pulse on the zero or one output terminals 46 and 47 respectively.

Reading head 25 scans a track on drum 12 which stores block start and end pulses. The start pulse in the signal of reading head 25, after amplification and shaping by amplifier 26 anad pulse shaper 27, is applied through diode 28 to flip-flop 24, initiating the block gating signal, and through diode 31 to flip-flop 32, initiating a start gating signal which allows the signal applied from differentiator-clipper 17 to pass through gate 33 and diode 34, triggering flip-flop 35, whose output is applied to delay line 23. The output signal from flip-flop 35, delayed by substantially one-half bit period, is derived from an appropriate tap of delay line 23 and applied through diode 36 as a resetting pulse to the other input of flip-flop 35, thereby causing flip-flop 35 to generate a pulse of substantially one-half bit period duration. This pulse is delayed approximately ¾ bit period by delay line 23 to provide the information gating signal applied to gates 21 and 22. The resetting pulse is also applied through diode 37 to flip-flop 32, terminating the start gating signal. To regenerate the information gating signal, a crossover pulse from gate 21 or 22 is applied through diode 41 or 42 respectively to set flip-flop 35. The block end pulse in the output signal from reading head 25 is amplified and shaped by preamplifier 43 and pulse shaper 44 and applied through diode 45, resetting flip-flop 24 and terminating the block gating signal, resulting in the cessation of the information gating signal and the output pulses from gates 21 and 22.

One method of utilizing the read-out information is to temporarily store it in a shift register in preparation for its use in conjunction with a computing system. Prior to each information pulse entering the register, a shift pulse is derived from delay line 23 at terminal 48 for shifting the register.

The foregoing discussion described the general layout of the system and facilitates understanding the detailed discussion which follows. The waveforms of Fig. 3 will be helpful in understanding the system operation. Referring to Fig. 3, the digit sequence of Fig. 1 is shown above waveforms associated therewith plotted to a common time scale. The digits in Fig. 3A have been divided into three groups, the block start pattern, the information block, and the block end pattern. The significance of the three groups will become clear from the ensuing discussion.

It was mentioned above that for each cell there is at least one zero crossover. Furthermore, the spacing between the significant crossovers is approximately one bit period. When auxiliary crossovers occur, they are positioned between the significant crossovers. In utilizing these crossovers for self-clocked readout it is essential to recognize the significant crossovers. This recognition is accomplished by proper utilization of the block start pulse of Fig. 3B derived from reading head 25 in conjunction with the block start pattern of Fig. 3A. It is noted that in this example the block start pattern consists of three Zeros and a One. A block start pulse is generated sometime after the first Zero and before the last Zero of the block start pattern, its exact position being immaterial; hence, the alignment tolerance between reading heads 11 and 25 is limited only by the number of digits chosen for the block end and block start pattern, the larger the number of digits devoted to start and end patterns, the less critical the alignment. One way of writing the start and stop pulses is by using the conventional non-return-to-zero (NRZ) writing system whereby the current in the writing head reverses polarity once during each block start and block end pattern. The reading head 25, responding to the change in residual flux in the magnetic medium caused by the reversal of the writing current, provides the positive start pulse and negative stop pulse of Fig. 3B. Amplifier 26 and pulse shaper 27 are arranged to provide a positive pulse through diodes 28 and 31 in response to only positive pulses from reading head 25, while amplifier 43 and pulse shaper 44 provide a positive pulse through diode 45 in response to negative pulses from reading head 25. The shaped pulse triggers flip-flops 24 and 32, commencing the generation of the block gating signal (Fig. 3E) and start gating signal (Fig. 3F) respectively. Figs. 3C and 3D display respectively the negative and positive spikes of Fig. 1G, the negative spikes of Fig. 1G being inverted in Fig. 3D. As mentioned earlier, the significant crossover related to a stored Zero is positive going while that related to a stored One is negative going. Hence, the spikes of Fig. 3C include spikes coincident with significant Zero crossovers; those of Fig. 3D, with significant One crossovers. Because of the block start pattern, a series of zeros are read out immediately after generation of the block start pulse. The spikes of Fig. 3C, which is the output signal of differentiator-clipper 17, is applied to gates 21 and 33. The start gating signal generated by flip-flop 32 and applied to gate 33 allows the second pulse of Fig. 3C to be applied through diode 34, triggering flip-flop 35 and initiating generation of the waveform of Fig. 3G. The output of flip-flop 35 (Fig. 3G) is applied to delay line 23, where after a delay of one-half bit period, this signal is applied to the other inputs of flip-flops 35 and 32 as resetting signals. Noting the duration of the start gating signal (Fig. 3F), it is seen that gate 33 is open only long enough to allow through the first Zero significant crossover pulse subsequent to initiation of the starting gate, this first pulse establishing the reference point from which subsequent significant crossovers may be determined.

As earlier mentioned, the crossover pulse passed by gate 33 sets flip-flop 35, resulting in the first positive-going change in the waveform of Fig. 3G. The information gating signal is derived by delaying the output waveform of flip-flop 35 (Fig. 3G) by substantially ¾ bit period in delay line 23. The signal from the ½ bit period delay tap resets flip-flop 35 after it has been set for ½ bit period. Comparison of Figs. 3C and 3H clearly reveals the desired result from combining the apparatus in the manner shown. The first rectangular pulse of the information gating signal, by virtue of the ¾ bit period delay introduced, squarely brackets the next significant zero crossover pulse. The simultaneous application to gate 21 of the significant zero crossover pulse 52 and gating pulse 51 results in an output pulse from gate 21 on terminal 46, indicating a Zero has been read out. The Zero auxiliary crossover pulse 53, applied to gate 22, does not occur in synchronism with an information gating pulse; therefore, it is not coupled by gate 22 to the One output terminal 47. Thus the ¾ bit period delay provides a gating pulse ½ bit period in duration centered about a time substantially one bit period after the gate initiating pulse, which is positioned to bracket the subsequent significant crossover pulse while not bracketing an auxiliary crossover pulse. By providing means for setting flip-flop 35 coincident with the generation of pulse 52, the next gating pulse applied to gates 21 and 22 is positioned to bracket the next significant crossover pulse, in this case pulse 54. Hence, the output pulse from gate 21 is applied through diode 41 to set flip-flop 35. When the significant crossover pulse is derived from a readout One, an output pulse is provided by gate 22 one One output terminal 47 and coupled through diode 42 for setting flip-flop 35. In this manner the gating signal of Fig. 3H is generated, subsequently bracketing pulses 55, 56, 57, 58, 61, 62, 63, and 64 after which flip-flop 24 is reset by the shaped block end pulse terminating the block gating signal (Fig. 3E) which disables gates 21 and 22. With the source of trigger pulses shut off to flip-flop 35, generation of the information gating signal also ceases.

While ideally the significant crossover pulses occur separated by precisely one bit period, the nature of the readout signal derived from a densely packed storage medium is such that this spacing deviates above and below the ideal of one bit period. It is for this reason that the duration of an information gating pulse is ½ bit period. This allows the occurrence of a significant crossover pulse to deviate as much as ±¼ bit period from the ideal one bit period spacing without deterioration in the accuracy of the read-out data.

If the read-out data is to be used in conjunction with a computer, it is desirable to provide means for synchronizing the data with an external clock which times the operations of the entire computer. One method of synchronization utilizes a shift register for storing the read-out binary digits. Prior to each significant crossover, a shift pulse is derived from an appropriate tap in delay line 23 and used to advance the register in preparation for the entry of the appropriate significant crossover pulse. The information is then removed from the register by applying shift pulses derived from the external clock.

While the apparatus described above employs a separate track for storing the block start and end pulses, the invention may be used without this separate track by inserting start and stop codes which contain a predetermined number of binary digits in a unique arrangement respectively positioned at the beginning and end of an information block. Then readout of the appropriate sequence of block start or end digits would indicate the start or end of an information block. For example, the stored information is often related to decimal numbers which require four binary digits to store the information corresponding to one decimal digit. Only ten of the sixteen possible combinations of binary digits are used to code the ten one digit decimal numbers; hence, two of the remaining four digit binary combinations may be selected for start and stop sequences.

To maintain the proper spacing between information blocks through numerous rewritings, information blocks at predetermined intervals are selected for special coding as reference blocks which are rewritten not more than a fixed number of times without rewriting the entire track. The specially coded readout signal from a reference block precludes writing information on the track until the end of the reference block, serving to provide a spacing scheme which prevents the overlapping of information blocks. When it is desired to rewrite an information block immediately following a reference block, the beginning of the information block is located with respect to the reference block. The beginning of any other information block, which is to be rewritten, is determined from the location of the immediately preceding information block.

Utilizing such sequences would require establishing a significant crossover reference time. Such a reference time might be established in a number of different ways. One method might utilize a portion of the track having, say for example 12 successive Zeros, a combination which would never occur in the information, stop, or start blocks. Then after counting, say eight identical digits, it would be known that the subsequent four digits were Zeros and the significant zero crossover would be determined.

An opportunity for verifying the read-out digits is presented by the presence of auxiliary crossovers. A gating signal for bracketing these auxiliary crossovers may be derived by selecting a signal from a 1/4 bit period delay tap of delay line 23 and applying this signal to separate gates energized respectively by differentiator clippers 17 and 18. An auxiliary crossover pulse, if it occurs, may then be compared with the two adjacent significant crossover pulses to verify the accuracy of the read digit.

Apparatus constructed in accordance with the principles disclosed herein then provides a system for readout of data stored in a magnetic medium which does not depend upon reading a storage cell at a particular time determined by an external clocking source. In the case where the storage cells are on a magnetic drum or tape, this system eliminates the need for maintaining a clock pulse reading head closely aligned with an information reading head, thereby facilitating the accurate readout of densely-packed stosed data.

It is apparent that one skilled in the art may make numerous modifications and additions to this example of an embodiment of apparatus for practicing the invention without departing from the principles disclosed herein. Consequently the invention is to be construed as limited only by the spirit and scope of the appended claims.

What is claimed is:

1. In a data processing system where data is recorded in a magnetic medium by changing the magnetic state thereof in accordance with said data, apparatus for interpreting the recorded data comprising, means for deriving a data signal related to the magnetic state of said medium, said data signal having significant crossovers whose slope is characteristic of the recorded data and which occur in substantially periodically spaced time intervals and auxiliary crossovers which, when present, occur outside said time intervals, means for deriving a crossover signal characteristic of the slope of said significant and auxiliary crossovers, and gating means responsive to said significant crossovers for providing said crossover signal as an output only when characteristic of the slope of said significant crossovers.

2. Data processing system apparatus for operating upon an input signal representing binary digital data, said data signal having significant polarity reversals occurring at periodically spaced time intervals, each of said significant polarity reversals being related to a digital data bit, said polarity reversals being of one sense when related to the binary digit one and the opposite sense when related to the binary digit zero and auxiliary polarity reversals which, when present, occur outside said time intervals, means for differentiating said data signal to provide significant and auxiliary crossover pulses corresponding respectively to the sense of the slope of said significant and auxiliary polarity reversals, means for deriving gating pulses from said significant crossover pulses, and gating means energized by said gating pulses and said crossover pulses for providing as an output only said significant crossover pulses.

3. In a data processing system utilizing a magnetic medium for information storage, self-clocked readout apparatus comprising, means for scanning said magnetic medium to derive a data signal related to the stored information and having auxiliary and significant crossovers which occur in mutually exclusive substantially periodically-spaced time intervals, the sense of the slope of said significant crossover being characteristic of the stored information, means for deriving significant crossover pulses related to the sense of the slope of said significant crossovers, a shift register, means for inserting said significant crossover pulses into storage in said shift register, a source of clock pulses, and means for applying said clock pulses to said shift register to remove said significant crossover pulses from storage therein in synchronism with said clock pulses.

4. In a data processing system having binary bit information recoverable from storage cells in a magnetic medium, self-clocked readout apparatus comprising, means for scanning said storage cells to derive a data signal characterized by significant crossovers the sense of whose slope is characteristic of the scanned binary bit, and spaced in time substantially one bit period apart, and auxiliary crossovers which, when present, occur substantially midway between said significant crossovers, means for differentiating said data signal to derive crossover pulses of polarity characteristic of the sense of the slope of a corresponding crossover, means for selecting a crossover pulse corresponding to a significant crossover, a flip-flop set by the selected crossover pulse, thereby initiating an output gating pulse, means for delaying said output gating pulse a predetermined time interval to provide a reset pulse for resetting said flip-flop thereby terminating said output gating pulse, means for delaying said output gating pulse a predetermined delay period to provide an information gating pulse, a gate energized by said information gating pulse and said crossover pulses and providing as an output only the significant crossover pulses corresponding to significant crossovers, and means for setting said flip-flop with said significant crossover pulses, thereby providing an output gating pulse for each significant crossover pulse.

5. Apparatus as in claim 4 wherein said predetermined time interval is substantially one-half bit period and said predetermined delay period is substantially three-fourths bit period.

6. Data processing apparatus comprising a magnetic drum having a clock track, and an information track with binary digits stored therein to define blocks, each block having a block start pattern, an information pattern, and a block end pattern, a reading head for scanning each track, the reading head associated with said clock track being arranged to provide block start and block end pulses while the reading head associated with said information track respectively scans said block start and said block end patterns, means for deriving from the reading head scanning said information track a pair of oppositely phased data signals having significant and auxiliary crossovers, means for differentiating said data signals to derive two series of crossover pulses related to the sense of the slope of said crossovers, a pair of waveform clipping circuits energized by said series for providing first and second trains of positive non-coincident crossover pulses, a block flip-flop set by said block start pulse for initiating a block gating pulse which is terminated when said block flip-flop is reset by said block end pulse, a start flip-flop set by said block start pulse for initiating a start gating pulse, a start gate energized by said first train of positive crossover pulses providing a selected pulse of said first train as an output when energized by said start gating pulse, an information flip-flop set by said selected pulse thereby initiating an information gating pulse therefrom, a delay line for providing as a reset pulse and delayed information gating pulse said information gating pulse delayed respectively one-half and three-fourths bit period, means for resetting said information and start flip-flops with said reset pulse, first and second gates energized jointly by said delayed information gating pulse and said block gating pulse and separately by said first and second pulse trains respectively to provide respectively first and second information pulses only when said first and second gates are energized by all three input signals thereto, and means for setting said information flip-flop with each information pulse, thereby providing an information gating pulse for each information pulse.

7. In a data processing system where binary bits are recorded in a magnetic medium and scanning said medium with a reading head provides a readout signal having a significant polarity reversal for each stored binary bit, and auxiliary polarity reversals which occur only between adjacent significant polarity reversals derived from scanning two like binary bits, the sense of said significant polarity reversals being characteristic of the scanned bit and the time spacing therebetween being substantially one bit period, self-clocked readout apparatus comprising, means for delaying said readout signal by substantially one-half bit period to provide a delayed readout signal, means for differentially combining said readout signal with said delayed readout signal to provide a pair of oppositely phased difference signals, means for limiting, differentiating, and clipping each of said difference signals to provide first and second sets of crossover pulses, means for selecting a pulse which coincides with a significant polarity reversal from said first set as a reference pulse, means for deriving from said reference pulse an information gating pulse centered in time substantially one bit period after said reference pulse so as to bracket in time the next subsequent significant crossover pulse, first and second gating means energized by said first and second sets and said information gating pulse to provide as an output pulse the significant crossover pulse following said reference pulse, means for thereafter deriving from each output pulse an information gating pulse centered in time to bracket the significant crossover pulse immediately following said output pulse, and means for applying each information gating pulse to said first and second gating means thereby providing each significant crossover pulse following said refeernce pulse as an output pulse, the output pulses from said first and second gating means signifying readout of respectively opposite binary bits.

8. In a data processing system for interpreting binary information bits recorded in a magnetic medium and the readout signal obtained therefrom has substantially a bit period time interval separating significant crossovers characteristic of said information bits, self-clocked readout apparatus comprising, a differential amplifier with one input energized by said readout signal and the other input energized by said readout signal delayed in time by substantially one-half bit period for providing as an output signal a pair of oppositely phased difference signals, means for limiting, differentiating and clipping said difference signals to provide respectively Zero pulses and One pulses, means for deriving start and stop pulses synchronous with the beginning and end respectively of readout of a block of said information bits, a block flip-flop set by said start pulse and reset by said stop pulse to provide a block gating pulse, a start flip-flop set by said start pulse to initiate a start gating pulse, a start gate which provides an output timing pulse when energized simultaneously by a Zero puse and said start gating pulse, an information flip-flop set by said timing pulse to initiate an output timed gating pulse, means for delaying said timed gating pulse by substantially one-half bit period to derive a reset pulse for resetting said information and start flip-flops thereby terminating said timed gating pulse and said start gating pulse, means for delaying said timed gating pulse by substantially three-fourths bit period to provide an information gating pulse, a Zero gate and a One gate respectively energized by said Zero and One pulses and jointly by said block and information gating pulses which provide as an output Zero and One bit pulses respectively when energized simultaneously by three input pulses, means for setting said information flip-flop with said bit pulses thereby regenerating timed gating pulses for the duration of said block gating pulse, and means for delaying said timed gating pulses to provide advance pulses.

9. In a data processing system where binary bits are recorded in a magnetic medium by energizing a writing head with current pulses in a manner whereby the readout signal derived from scanning said medium with a reading head has for each bit a significant polarity reversal whose sense is characteristic of the recorded bit said reading head instantaneously scans and auxiliary crossovers which occur only between significant polarity reversals of like sense, said significant polarity reversals separated in time by substantially one bit period, self-clocked readout apparatus comprising, means for delaying said readout signal by substantially one-half bit period to provide a delayed signal, means for differentially combining said readout signal with said delayed signal to provide a pair of oppositely phased difference signals, means for deriving from said difference signals significant and auxiliary crossover pulses characteristic of the sense of said significant and auxiliary polarity reversals respectively, means for selecting a significant crossover pulse as a reference pulse for initiating a delayed gating pulse centered about a time substantially one bit period after said reference pulse so as to bracket the significant crossover pulse which immediately follows said reference pulse, gating means which provides an output pulse characteristic of said scanned binary bit when energized by said delayed gating pulse coincidentally with the significant crossover pulse which immediately follows said reference pulse, means for initiating with said output pulse a regenerated delayed gating pulse commencing substantially one bit period after initiating the immediately preceding delayed gating pulse to bracket the next significant crossover pulse, and means for applying each regenerated delayed gating pulse and each crossover pulse to said gating means thereby providing an output signal which includes said significant crossover pulses while excluding said auxiliary crossover pulses.

10. Data processing apparatus comprising, a magnetic drum having an information track with binary digits stored therein to define blocks each having a block start pattern, an information pattern, and a block end pattern, the information pattern of periodically spaced blocks, selected as reference blocks, encoded in a predetermined manner to preclude their erasure except when said information track is completely erased, a reading head for scanning said track to provide a readout signal which includes start signals, information signals and end signals respectively characteristic of said block start, information and block end patterns, said start, information and end signals characterized by a significant polarity reversal for each binary bid read out whose sense is characteristic of the readout bit, and an auxiliary polarity reversal between each pair of adjacent significant polarity reversals of the same sense, means for recognizing a significant polarity reversal in each start signal as a reference crossover, means for deriving from said reference crossover and from each succeeding significant polarity reversal a gating pulse which is centered about a time coincident with the next significant polarity reversal, means for deriving a crossover signal characteristic of the sense of said significant and auxiliary porality reversals, gating means energized by said crossover signal and said gating pulses for providing as an output signal only those portions of said crossover signal characteristic of said significant polarity reversals, and means for interpreting those portions of said output signal characteristic of said reference blocks to derive an inhibiting signal which prevents the recording of data in said reference block except after complete erasure of said information track.

11. Self-clocked data readout apparatus utilizing an electrical input singal representing binary digital data, the input signal being characterized by periodically spaced significant polarity reversals, each significant polarity reversal being associated with a digital bit and the sense of the reversal being determined by the value of the associated bit, the input signal including auxiliary polarity reversals indicative of contiguous bits of the same digital value, said apparatus comprising polarity reversal sensing means responsive to said input signal for providing a crossover pulse for each polarity reversal in said input signal, gating means having said crossover pulses applied to the input thereof, pulse delay means responsive to a start signal derived from said input signal for providing a gating signal to cause said gating means to open for an interval during which only a crossover pulse derived from a significant polarity reversal can exist at the input of said gating means, and means for applying each gated crossover pulse to said pulse delay means, said pulse delay means in response to said gated crossover pulse providing a gating signal causing said gating means to open for an interval during which only the next succeeding crossover pulse derived from a significant polarity reversal can exist at the input of said gating means.

References Cited in the file of this patent

UNITED STATES PATENTS

| | | |
|---|---|---|
| 2,609,143 | Stibitz | Sept. 2, 1952 |
| 2,700,155 | Clayden | Jan. 18, 1955 |
| 2,734,186 | Williams | Feb. 7, 1956 |
| 2,764,463 | Lubkin et al. | Sept. 25, 1956 |
| 2,804,605 | De Turk | Aug. 27, 1957 |

OTHER REFERENCES

"Techniques for Increasing Storage Density of Magnetic Drum Systems" (Fuller et al.) Proceedings of the Eastern Joint Computer Conference, Dec. 8–10, 1954, pp. 16–21.